United States Patent
Lyuh et al.

(10) Patent No.: US 8,369,620 B2
(45) Date of Patent: Feb. 5, 2013

(54) OBJECT DETECTION DEVICE AND SYSTEM

(75) Inventors: Chun-Gi Lyuh, Daejeon (KR);
  Sanghun Yoon, Daejeon (KR); Ik Jae Chun, Daejeon (KR); Jung Hee Suk, Daejeon (KR); Tae Moon Roh, Daejeon (KR); You-sun Kim, Seoul (KR); Sung-Jea Ko, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 239 days.

(21) Appl. No.: 13/010,316

(22) Filed: Jan. 20, 2011

(65) Prior Publication Data
US 2012/0099790 A1    Apr. 26, 2012

(30) Foreign Application Priority Data
Oct. 20, 2010 (KR) .................. 10-2010-0102547

(51) Int. Cl.
*G06K 9/00* (2006.01)
(52) U.S. Cl. ............. 382/170; 382/173; 382/190
(58) Field of Classification Search .............. 382/168, 382/170, 171, 173, 176, 181, 190, 199, 290; 209/584, 900; 356/622; 348/222.1, 208.1; 358/403; 345/581, 427; 701/28; 84/600, 84/603
See application file for complete search history.

(56) References Cited

U.S. PATENT DOCUMENTS

| | | | |
|---|---|---|---|
| 5,668,898 A * | 9/1997 | Tatsuta | 382/290 |
| 6,674,905 B1 * | 1/2004 | Matsugu et al. | 382/199 |
| 7,853,072 B2 | 12/2010 | Han et al. | |
| 8,050,499 B2 * | 11/2011 | Kanatsu | 382/173 |

FOREIGN PATENT DOCUMENTS

| | | | |
|---|---|---|---|
| KR | 1020050100729 A | 10/2005 | |
| KR | 1020080026326 A | 3/2008 | |
| KR | 1020090032808 A | 4/2009 | |
| KR | 1020090099349 A | 9/2009 | |
| KR | 1020100031481 A | 3/2010 | |

* cited by examiner

Primary Examiner — Anh Hong Do (57) ABSTRACT

Provided are an object detection device and system. The object detection device includes an outline image extraction unit, a feature vector calculation unit, and an object judgment unit. The outline image extraction unit extracts an outline image from an input image. The feature vector calculation unit calculates a feature vector from the outline image by using histogram of oriented gradients (HOG) representing a frequency distribution of gradient vectors with respect to pixels of the outline image, and pixel coordinate information varying according to a spatial distribution of the gradient vectors. The object judgment unit judges a target object corresponding to the feature vector with reference to pre-learned data.

14 Claims, 7 Drawing Sheets

OBJECT DETECTION DEVICE AND SYSTEM

CROSS-REFERENCE TO RELATED APPLICATIONS

This U.S. non-provisional patent application claims priority under 35 U.S.C. §119 of Korean Patent Application No. 10-2010-0102547, filed on Oct. 20, 2010, the entire contents of which are hereby incorporated by reference.

BACKGROUND OF THE INVENTION

The present invention disclosed herein relates to an object detection device and system, and more particularly, to an object detection device and system for detecting a target object from an image obtained by an imaging device.

Object detection technology of detecting a target object from an image obtained by an image device such as a digital camera is an important research subject in the field of computer vision. In the case of detecting target objects such as vehicles and human bodies using color and brightness, since the color and brightness of the target objects may easily vary according to conditions, the accuracy of object detection may be reduced. An object detection technique of using an outline of a target object has been proposed in order to make up for such a limitation. For example, a target object may be detected by a comparison of pre-learned data and feature vectors with respect to an acquired image. Here, the feature vector denotes outline information of the target object. Histogram of Oriented Gradients (HOG) is being widely used as the feature vector.

However, when only HOG is used as a feature vector, the accuracy of object detection may be reduced. Particularly, possibility of a judgment error may considerably increase in an image like a motion image having a serious deterioration in its image quality.

SUMMARY OF THE INVENTION

The present invention provides an object detection device and system for more exactly detecting a target object from an acquired image.

Embodiments of the present invention provide object detection devices including: an outline image extraction unit extracting an outline image from an input image; a feature vector calculation unit calculating a feature vector from the outline image by using histogram of oriented gradients (HOG) representing a frequency distribution of gradient vectors with respect to pixels of the outline image, and pixel coordinate information varying according to a spatial distribution of the gradient vectors; and an object judgment unit judging a target object corresponding to the feature vector with reference to pre-learned data.

In some embodiments, the feature vector calculation unit may include: a HOG calculation module calculating a gradient intensity and a gradient direction with respect to each of the pixels and calculating the HOG using the gradient intensity and the gradient direction; a coordinate mean value calculation module calculating a mean value of pixel coordinates by unit of a bin of the HOG, with respect to pixels having a gradient vector corresponding to an equal bin of the HOG; and a coordinate dispersion value calculation module calculating a dispersion value of pixel coordinates by unit of a bin of the HOG, with respect to pixels having a gradient vector corresponding to an equal bin of the HOG, and the pixel coordinate information may include the mean value and the dispersion value of the pixel coordinates. The pre-learned data may include pattern information and identification information of objects. The object judgment unit may judge whether pattern information matching the feature vector is included in the pre-learned data. The object judgment unit: may output detection success notification information and identification information of the target corresponding to the pattern information as a result of the judgment when the pattern information matching the feature vector is included in the pre-learned data; and output detection failure notification information as the result of the judgment when the pattern information matching the feature vector is not included in the pre-learned data. The pre-learned data may be generated by repetitively learning about unique patterns of objects. The bin of the HOG may represent a quantized section with respect to a range of the gradient direction. The feature vector calculation unit may divide the outline image into a plurality of cells, and calculate the HOG and the pixel coordinate information with respect to each of the plurality of cells. The outline image extraction unit may extract the outline image the input image using an outline extraction algorithm and a high pass filter.

In other embodiments of the present invention, object detection systems include: an imaging device generating an image by photographing a subject; and an object detection device extracting an outline image from an input image, calculating a feature vector by using histogram of oriented gradients (HOG) with respect to the outline image, and a mean value and a dispersion value of pixel coordinates with respect to pixels of the outline image, and judging a target object corresponding to the feature vector with reference to pre-learned data.

In some embodiments, the objection detection device may calculate the mean value and the dispersion value of the pixel coordinates by unit of a bin of the HOG. The objection detection device may divide the outline image into a plurality of cells, and calculate the HOG, and the mean value and the dispersion value of the pixel coordinates with respect to each of the plurality of cells. The objection system may further include a display device displaying a judgment result of the target object and the image. The objection system may further include a storage device storing a judgment result of the target object and the image.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereinafter, it will be described about an exemplary embodiment of the present invention in conjunction with the accompanying drawings.

Figure 1:
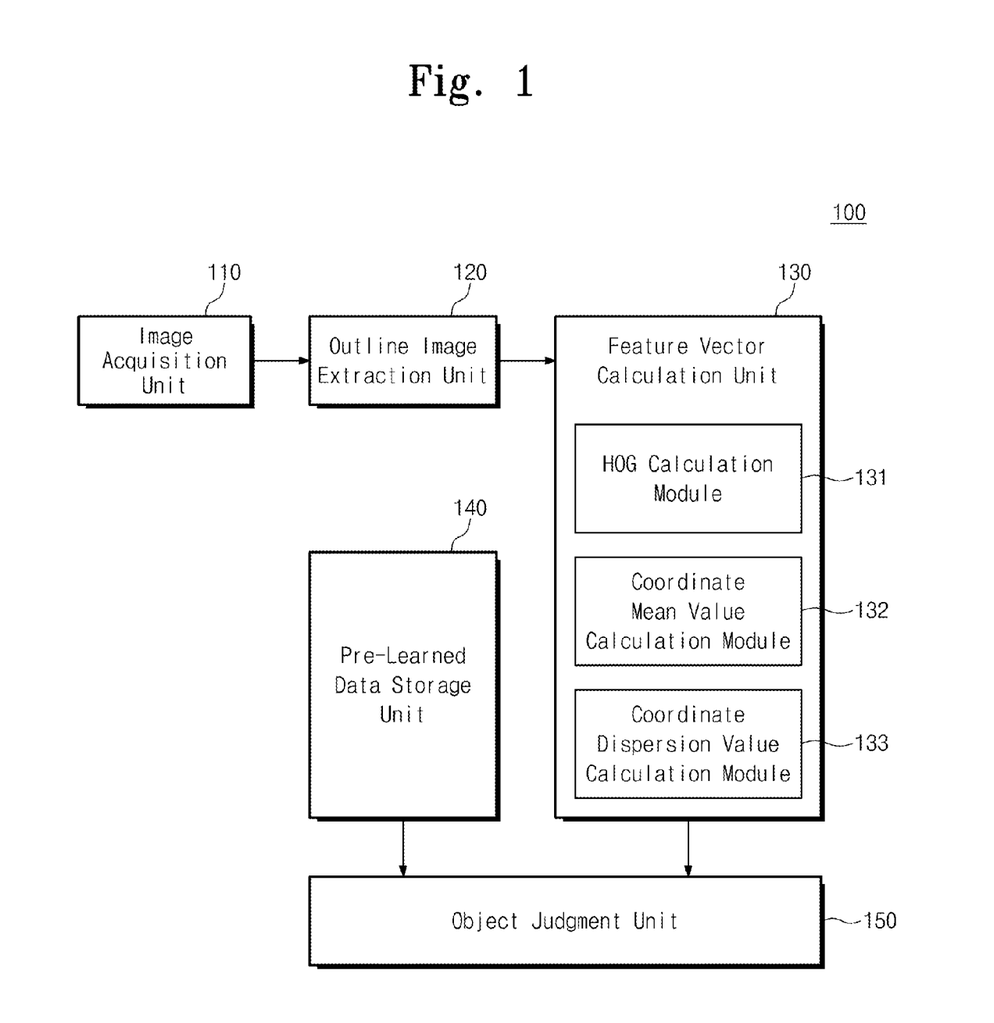
FIG. 1 is a block diagram illustrating an object detection device according to an embodiment of the present invention.

FIG. 1 is a block diagram illustrating an object detection device 100 according to an embodiment of the present invention. Referring to FIG. 1, the object detection device 100 may include an image acquisition unit 110, an outline image extraction unit 120, a feature vector calculation unit 130, a pre-learned data storage unit 140, and an object judgment unit 150.

The image acquisition unit 110 may acquire an image including a target object from an external device. For example, the image acquisition unit 110 may acquire an image provided from a device such as an imaging device and an image storage device. The image acquisition unit 110 may deliver the acquired image to the outline image extraction unit 120.

The outline image extraction unit 120 may extract an outline image from the acquired image using an outline extraction algorithm and a High-Pass Filter (HPF). The outline image extraction unit 120 may deliver the outline image to the feature vector calculation unit 130.

The feature vector calculation unit 130 may calculate a feature vector from the outline image. Generally, the feature vector may be configured only with HOG. Here, HOG may denote a histogram showing a frequency distribution of gradient vectors corresponding to a plurality of pixels. However, the feature vector according to an embodiment of the present invention may be calculated using pixel coordinate information as well as HOG. Here, the pixel coordinate information may signify a mean value and a dispersion value calculated by unit of bin of HOG, with respect to pixels having gradient vectors corresponding to the same bin of HOG. That is, the pixel coordinate information may reflect a spatial distribution of gradient vectors with respect to pixels.

The feature vector calculation unit 130 may include a HOG calculation module 131, a coordinate mean value calculation module 131, and a coordinate dispersion value calculation module 133.

The HOG calculation module 131 may first divide an outline image into a plurality of cells to calculate HOG, and may calculate gradient vectors for each cell. Also, the HOG calculation module 131 may calculate HOG for each cell on the basis of such gradient vectors. The HOG calculation according to an embodiment of the present invention will be described in detail with reference to FIGS. 2 through 5.

The coordinate mean value calculation module 131 may calculate a mean value of pixel coordinates by unit of bin of HOG, with respect to pixels having a gradient vector corresponding to the same bin of HOG. The mean value of the pixel coordinates may be calculated by Equation (1).

$$\text{mean\_x}_k = \frac{\sum x_k}{N_k},$$

$$\text{mean\_y}_k = \frac{\sum y_k}{N_k}$$

(1)

where mean_xk and mean_yk denote a mean value of x-coordinates and a mean value of y-coordinates of pixels having gradient vectors corresponding a k-th bin of HOG, respectively. Also, xk, yk, and Nk denote x-coordinate, y-coordinate, and number of pixels having the gradient vectors corresponding to the k-th bin of HOG.

The coordinate dispersion value calculation module 133 may calculate a dispersion value of pixel coordinates by unit of bin of HOG, with respect to pixels having a gradient vector corresponding to the same bin of HOG. The dispersion value of the pixel coordinates may be calculated by Equation (2).

$$\text{cov\_x}_k = \frac{\sum (x_k - \text{mean\_x}_k)^2}{N_k},$$

$$\text{cov\_y}_k = \frac{\sum (y_k - \text{mean\_y}_k)^2}{N_k}$$

(2)

where cov_xk and cov_yk denote a dispersion value of x-coordinates and a dispersion value of y-coordinates of pixels having gradient vectors corresponding a k-th bin of HOG, respectively.

The feature vector calculation unit 130 may calculate a feature vector using the mean values and the dispersion values of pixel coordinates, and HOGs with respect to the plurality of cells. For example, the feature vector may include mean values and dispersion values of vectorized pixel coordinates and HOGs. That is, the feature vector according to an embodiment of the present invention may be calculated in consideration of pixel coordinate information as well as HOG. The feature vector calculation unit 130 may deliver the feature vector to the object judgment unit 150.

The pre-learned data storage unit 140 may store pre-learned data regarding various objects such as human bodies and vehicles. The pre-learned data storage unit 140 may deliver the pre-learned data to the object judgment unit 150 as reference information for judging a target object.

The pre-learned data may include pattern information and identification information on the objects. Here, the pattern information may signify information that is a comparison target with the feature vector, and the identification information may signify information for showing unique characteristics of the objects such as name, type, and size of object.

The pre-learned data may be generated by repetitive learning about unique pattern of the objects. In this case, a mechanical learning algorithm such as Adaboost and Support Vector Machine (SVM) may be applied to generate the pre-learned data.

The object judgment unit 150 may judge a target object corresponding to the feature vector with reference to the pre-learned data. The object judgment unit 150 may output a judgment result with respect to the target object. For example, when pattern information corresponding to the feature vector is included in the pre-learned data, the object judgment unit 150 may output the identification information of the target object corresponding to detection success notification information and pattern information as a judgment result. In contrast, when the pattern information corresponding to the feature vector is not included in the pre-learned data, the object judgment unit 150 may output detection failure notification information as a judgment result. These judgment results may be provided to an external display device and a storage device.

Figure 2:
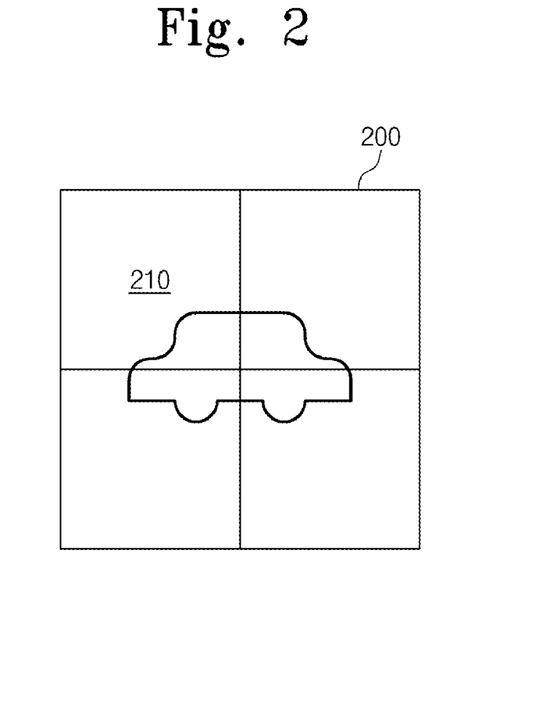
FIG. 2 is a diagram illustrating an outline image extracted from an acquired image.
Figure 3:
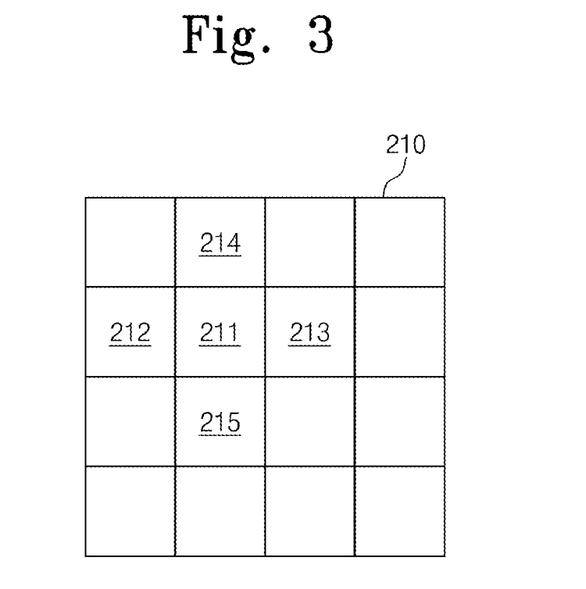
FIG. 3 is a diagram illustrating one of cells constituting the outline image shown in FIG. 2.
Figure 4:
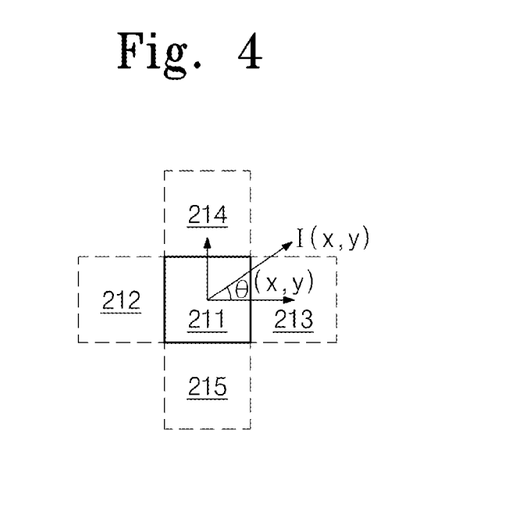
FIG. 4 is a diagram illustrating a gradient vector with respect to one of pixels constituting the cell shown in FIG. 3.
Figure 5:
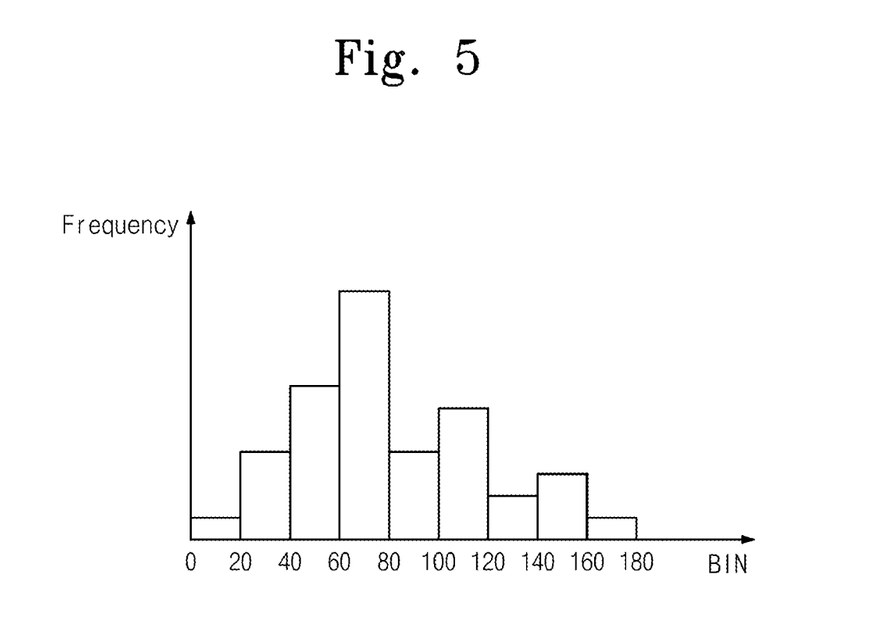
FIG. 5 is a diagram illustrating Histogram of Oriented Gradients (HOG) with respect to the cell shown in FIG. 3.

FIG. 2 is a diagram illustrating an outline image 200 extracted from an acquired image. FIG. 3 is a diagram illustrating one 210 of cells constituting the outline image 200 shown in FIG. 2. FIG. 4 is a diagram illustrating a gradient vector with respect to one 211 of pixels constituting the cell 210 shown in FIG. 3. FIG. 5 is a diagram illustrating Histogram of Oriented Gradients (HOG) with respect to the cell 210 shown in FIG. 3.

Referring to FIG. 2, the outline image 200 may be extracted from an acquired image using an outline extraction algorithm or a high pass filter. In the drawing, an outline of a vehicle is shown as an outline of a target object.

The outline image 200 may be divided into a plurality of cells. Although four cells (2×2 cells) are exemplarily shown in the drawing, the number of cells is not limited thereto. For example, the outline image 200 may be divided into various number of cells.

HOGs constituting a feature vector may be calculated with respect to a plurality of cells. That is, the number of HOGs constituting a feature vector may correspond to the number of cells. Hereinafter, calculation of gradient vectors used to calculate HOG with respect to one cell 210 will be exemplarily described.

Referring to FIGS. 3 and 4, the cell 210 may include a plurality of pixels. Although 16 pixels (4×4 pixels) are shown in the drawing, the number of pixels is not limited thereto. For example, the cell 210 may include various number of pixels. For example, the size of the cell 210 may be defined as about 8×8 pixels or about 16×16 pixels.

The gradient vectors may be calculated with respect to the plurality of pixels, respectively. However, since pixels adjacent to pixel (hereinafter, referred to as "target pixel") corresponding to each gradient vector is considered upon calculation of each gradient vector, calculation of gradient vectors may be omitted with respect to pixels located at the edge of the cell 210.

Here, calculation of a gradient vector GV may be exemplarily described with respect to a first pixel 211 as a target pixel. In order to calculate the gradient vector GV with respect to the first pixel 211 according to an embodiment of the present invention, brightness values of second to fifth pixels 212 to 215 adjacent to the first pixel 211 may be used. In this case, assuming that the brightness value of the first pixel 211 is P(x, y), the brightness values of the second to fifth pixels 212 to 215 may be defined as P(x−1, y), P(x+1, y), P(x, y−1), and P(x, y+1), respectively. Here, x and y denote coordinates of the first pixel 211.

The size (hereinafter, referred to as "gradient intensity I(x, y)") of the gradient vector GV with respect to the first pixel 211 may be calculated according to Equation (3). Also, an angle (hereinafter, referred to as "gradient direction Θ(x, y)") of the gradient vector GV with respect to the first pixel 211 may be calculated according to Equation (4).

$$I(x, y) = \sqrt{[P(x+1, y) - P(x-1, y)]^2 + [P(x, y+1) - P(x, y-1)]^2} \quad (3)$$

$$\theta(x, y) = \tan^{-1}\left[\frac{P(x, y+1) - P(x, y-1)}{P(x+1, y) - P(x-1, y)}\right] \quad (4)$$

Here, the gradient direction Θ(x, y) may be adjusted within a range of about 0 degree to about 180 degrees. For example, about 225 degrees may be adjusted to about 45 degrees. That is, about 225 degrees and about 45 degrees may represent an equal gradient direction Θ(x, y).

On the other hand, gradient intensities and gradient directions of other pixels may be calculated similarly to the above method.

In an embodiment of the present invention, the gradient vector with respect to the target pixel may be calculated in consideration of four pixels adjacent to the target pixel in the horizontal and vertical directions, but pixels that are considered in calculating the gradient vector with respect to the target pixel are not limited thereto. For example, the gradient vector with respect to the target pixel may be calculated in consideration of four pixels that are adjacent to the target pixel in oblique directions. Also, the gradient vector with respect to the target pixel may be calculated in consideration of eight pixels adjacent to the target pixel in the horizontal, vertical, and oblique directions. Different values may be applied with respect to the brightness values of such adjacent pixels.

The gradient vectors with a plurality of pixels may be used to calculate HOG as shown in FIG. 5. Referring to FIG. 5, the bin of HOG may signify a quantized section with respect to a range (from about 0 degree to about 180 degrees) of a gradient direction. The frequency of HOG may signify a cumulative value of the gradient intensities according to the bin of HOG.

Although HOG having eight bins is shown in the drawing, the number of bins of HOG is not limited thereto. For example, HOG may have various number of bins.

Figure 6:
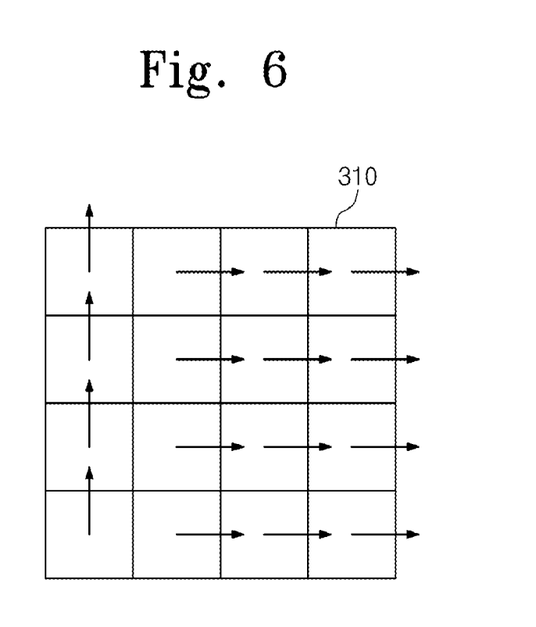
FIGS. 6 and 7 are diagrams illustrating gradient vectors in one cell.
Figure 7:
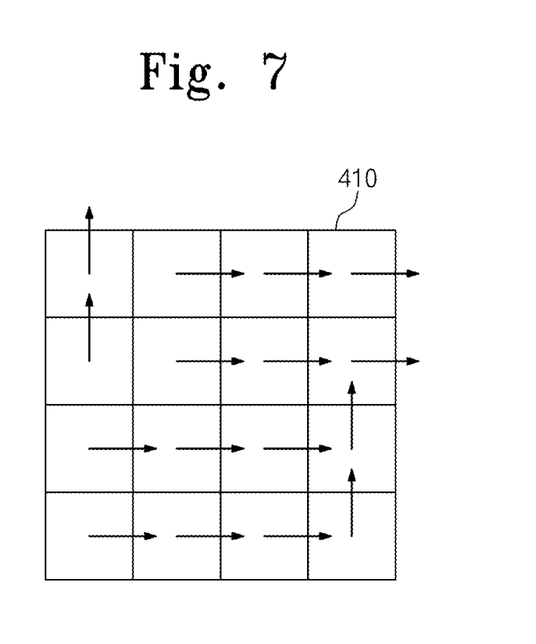

FIGS. 6 and 7 are diagrams illustrating gradient vectors in one cell. For simplicity of explanation, it will be assumed that sizes of gradient vectors of a cell (hereinafter, referred to as "first cell") 310 shown in FIG. 6 and gradient vectors of a cell (hereinafter, referred to as "second cell") 410 shown in FIG. 7 are equal to each other. That is, it will be assumed that the gradient intensities of the first and second cells 310 and 410 are equal to each other.

Referring to FIGS. 6 and 7, 12 gradient vectors having a gradient direction of about 0 degree and four gradient vectors having a gradient direction of about 90 degrees may be calculated with respect to the first and second cells 310 and 410, respectively. Accordingly, HOG with respect to the first cell 310 may be equal to HOG with respect to the second cell 410. However, as shown in the drawing, considering a spatial distribution of the gradient vectors, it can be known that information representing the first cell 310 and information representing the second cell 410 are different from each other. This means that, when only HOGs are used as a feature vector, the accuracy of object detection may be reduced because the spatial distribution of the gradient vectors is not considered.

The object detection device (100 of FIG. 1) according to an embodiment of the present invention can increase the accuracy of object detection by calculating the feature vector using mean values and dispersion values of pixel coordinates according to the bin of HOG, as well as HOGs.

Figure 8:
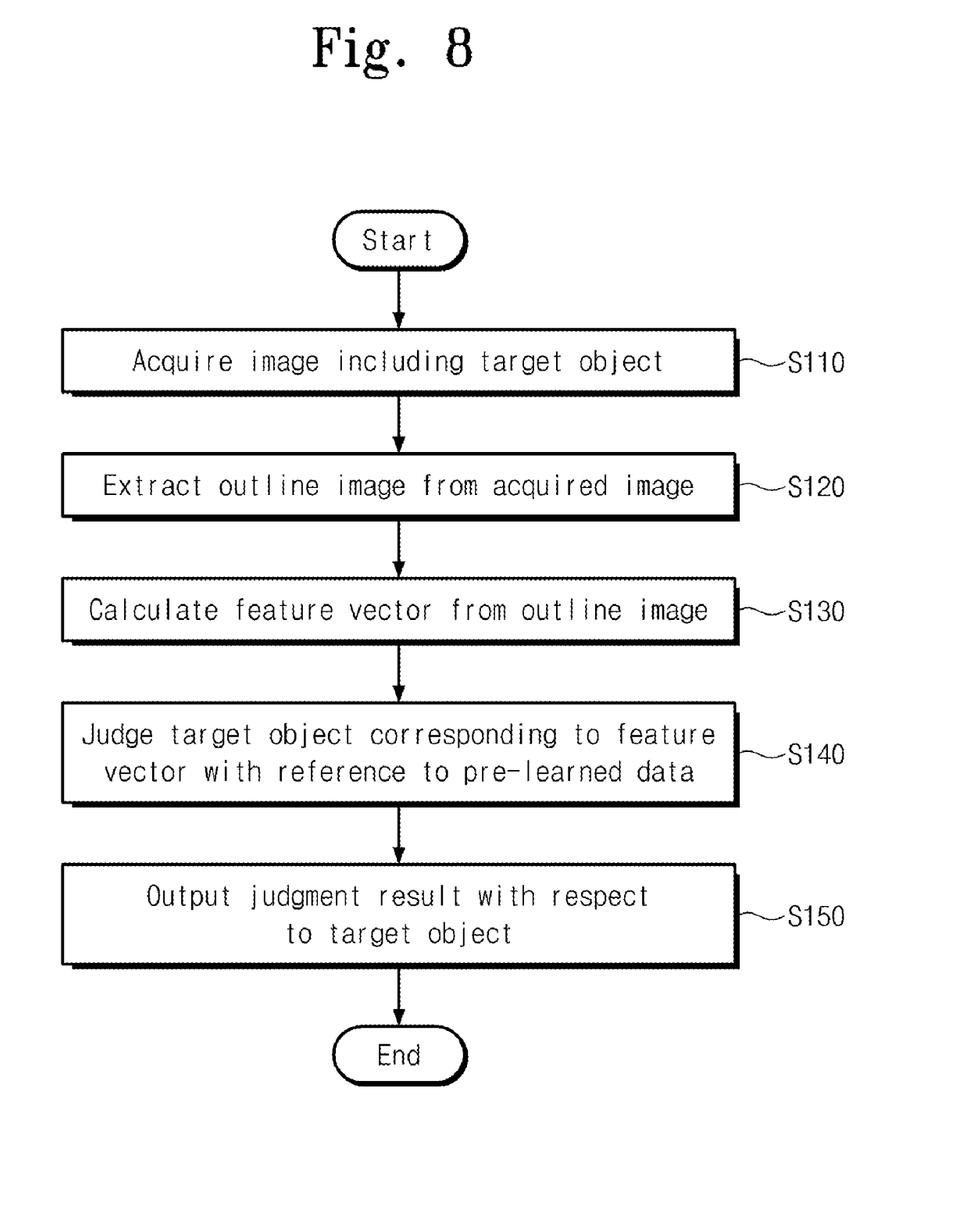
FIG. 8 is a flowchart illustrating an object detection method according to an embodiment of the present invention.

FIG. 8 is a flowchart illustrating an object detection method according to an embodiment of the present invention. Referring to FIG. 8, in operation S110, an image including a target object may be acquired by an external device such as an imaging device and an image storage device.

In operation S120, an outline image may be extracted from the acquired image by an outline extraction algorithm and a high pass filter.

In operation S130, a feature vector may be calculated from the outline image using mean values and dispersion values of pixel coordinates according to the bin of HOG and HOGs. A method of calculating the feature vector will be described in detail with reference to FIG. 9.

In operation S140, the target object corresponding to the feature vector may be judged with reference to pre-learned data. That is, the target object may be judged by a comparison between the feature vector and the pre-learned data.

In operation S150, a judgment result with respect to the target object may be outputted. Here, the judgment result may be identification information of the target object corresponding to detection success notification information and the pattern information. Alternatively, the judgment result may be detection failure notification information.

Figure 9:
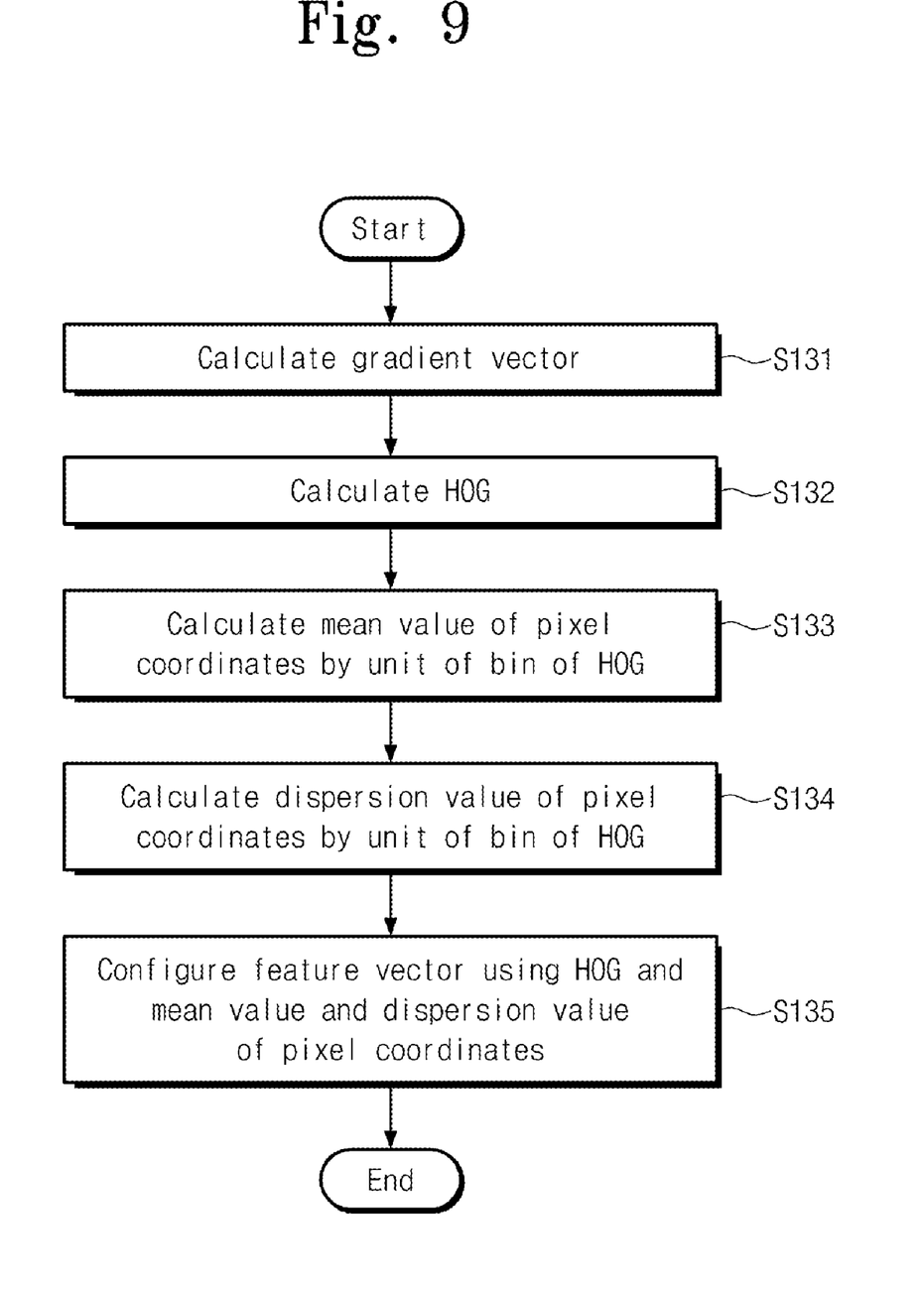
FIG. 9 is a flowchart illustrating a feature vector calculation method according to an embodiment of the present invention.

FIG. 9 is a flowchart illustrating a feature vector calculation method according to an embodiment of the present invention. For simplicity of explanation, it will be assumed that the outline image is not divided into a plurality of cells. That is, it will be assumed that the outline image is one cell.

Referring to FIG. 9, in operation S131, gradient vectors with respect to pixels of the outline image may be calculated. Since the method of calculating the gradient vectors has been already described with reference to FIGS. 3 and 4, and Equations (3) and (4), a detailed description thereof will be omitted below.

In operation S132, HOG may be calculated using the gradient vectors. In this case, the bin of HOG may signify a quantized section with respect to a range of a gradient direction. The frequency of HOG may signify a cumulative value of the gradient intensities according to the bin of HOG.

In operation S133, a mean value of pixel coordinates with respect to pixels having a gradient vector corresponding to an equal bin of HOG may be calculated by unit of the bin of HOG. The mean values of the pixel coordinates calculated by unit of the bin of HOG may be calculated according to Equation (1).

In operation S134, a dispersion value of pixel coordinates with respect to pixels having a gradient vector corresponding to an equal bin of HOG may be calculated by unit of the bin of HOG. The dispersion values of the pixel coordinates calculated by unit of the bin of HOG may be calculated according to Equation (2).

In operation S135, a feature vector may be configured with HOG, and the mean values and the dispersion values of the pixel coordinates. For example, the feature vector may be configured with HOG, and the mean values and the dispersion values of the vectorized pixel coordinates.

Figure 10:
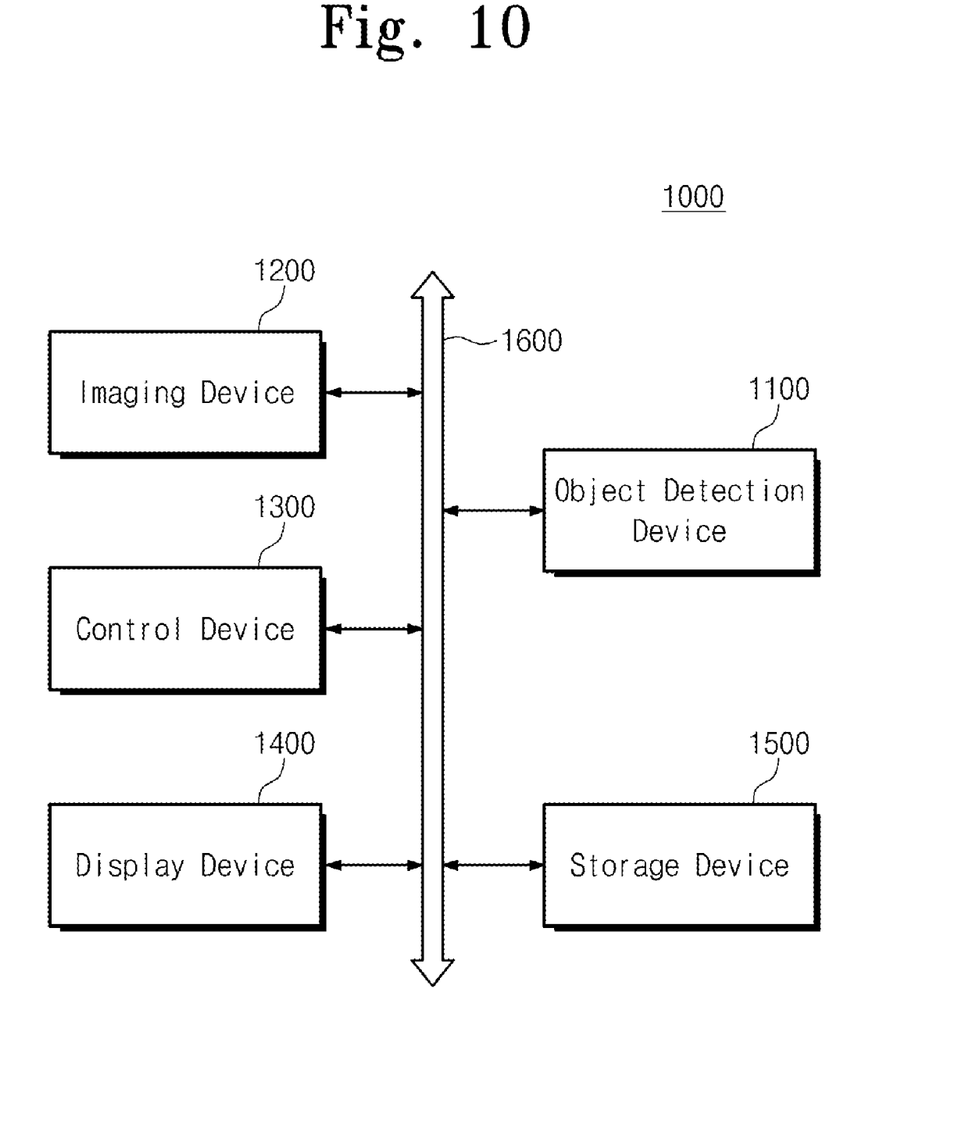
FIG. 10 is a block diagram illustrating an object detection system according to an embodiment of the present invention.

FIG. 10 is a block diagram illustrating an object detection system 1000 according to an embodiment of the present invention. Referring to FIG. 10, the object detection system 1000 may include an object detection device 1100, an imaging device 1200, a control device 1300, a display device 1400, a storage device 1500, and a system bus 1600.

The object detection device 1100 may perform an objection detection operation on an image provided from the imaging device 1200 and the storage device 1500. The object detection device 1100 may provide an object detection result to the display device 1400 and the storage device 1500. Here, the object detection result may include identification information of a target object.

For the object detection, the object detection device 1100 may generate a feature vector using mean values and dispersion values of pixel coordinates according to the bin of HOG as well as HOGs. The object detection device 1100 may judge a target object corresponding to the feature vector with reference to pre-learned data.

As described above, when the feature vector is configured in consideration of pixel coordinate information according to an embodiment of the present invention, the accuracy of object detection may be more improved than that in the case where the feature vector is configured with only HOGs.

The imaging device 1200 may photograph a subject to generate an image. The imaging device 1200 may deliver the generated image to the object detection device 1100, the display device 1400, and the storage device 1500. Although not shown in the drawing, the imaging device 1200 may include a lens, an image sensor, and a signal processing module.

The control device 1300 may control overall operations of the object detection system 1000. That is, the control device 1300 may control the object detection device 1100, the imaging device 1200, the display device 1400, and the storage device 1500, respectively.

The display device 1400 may display the image provided from the imaging device 1200 and the storage device 1500. Also, the display device 1400 may display the object detection result provided from the object detection device 1100 or the storage device 1500. The display device 1400 may be implemented with a liquid crystal display (LCD) device, a field emission display, and an organic light emitting display.

The storage device 1500 may store the object detection result provided from the object detection device 1100. Also, the storage device 1500. The storage device 1500 may be implemented with volatile memory devices and nonvolatile memory devices. For example, the storage device 1500 may be implemented with static RAM (SRAM), dynamic RAM (DRAM), synchronous DRAM (SDRAM), read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM).

The system bus 1600 may connect the object detection device 1100, the imaging device 1200, the control device 1300, the display device 1400, and the storage device 1500 in the object detection system 1000. The system bus 1600 may provide interfaces for connecting to external computers, networks, and removable storage media.

In an object detection device and system according to an embodiment of the present invention, it is possible to increase the accuracy of object detection by configuring feature vectors using HOG and pixel coordinate information.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An object detection device comprising:
    an outline image extraction unit extracting an outline image from an input image;
    a feature vector calculation unit calculating a feature vector from the outline image by using a histogram of oriented gradients (HOG) representing a frequency distribution of gradient vectors with respect to pixels of the outline image, and pixel coordinate information varying according to a spatial distribution of the gradient vectors; and
    an object judgment unit judging a target object corresponding to the feature vector with reference to pre-learned data.

2. The object detection device of claim 1, wherein the feature vector calculation unit comprises:
   a HOG calculation module calculating a gradient intensity and a gradient direction with respect to each of the pixels and calculating the HOG using the gradient intensity and the gradient direction;
   a coordinate mean value calculation module calculating a mean value of pixel coordinates by unit of a bin of the HOG, with respect to pixels having a gradient vector corresponding to an equal bin of the HOG; and
   a coordinate dispersion value calculation module calculating a dispersion value of pixel coordinates by unit of a bin of the HOG, with respect to pixels having a gradient vector corresponding to an equal bin of the HOG, and the pixel coordinate information comprises the mean value and the dispersion value of the pixel coordinates.

3. The object detection device of claim 2, wherein the pre-learned data comprises pattern information and identification information of objects.

4. The object detection device of claim 3, wherein the object judgment unit judges whether pattern information matching the feature vector is comprised in the pre-learned data.

5. The object detection device of claim 4, wherein the object judgment unit:
   outputs detection success notification information and identification information of the target corresponding to the pattern information as a result of the judgment when the pattern information matching the feature vector is comprised in the pre-learned data; and
   outputs detection failure notification information as the result of the judgment when the pattern information matching the feature vector is not comprised in the pre-learned data.

6. The object detection device of claim 2, wherein the pre-learned data is generated by repetitively learning about unique patterns of objects.

7. The object detection device of claim 2, wherein the bin of the HOG represents a quantized section with respect to a range of the gradient direction.

8. The object detection device of claim 1, wherein the feature vector calculation unit divides the outline image into a plurality of cells, and calculates the HOG and the pixel coordinate information with respect to each of the plurality of cells.

9. The object detection device of claim 1, wherein the outline image extraction unit extracts the outline image from the input image using an outline extraction algorithm and a high pass filter.

10. An object detection system comprising:
   an imaging device generating an image by photographing a subject; and
   an object detection device extracting an outline image from an input image, calculating a feature vector by using a histogram of oriented gradients (HOG) with respect to the outline image, and a mean value and a dispersion value of pixel coordinates with respect to pixels of the outline image, and judging a target object corresponding to the feature vector with reference to pre-learned data.

11. The object detection system of claim 10, wherein the objection detection device calculates the mean value and the dispersion value of the pixel coordinates by unit of a bin of the HOG.

12. The object detection system of claim 10, wherein the objection detection device divides the outline image into a plurality of cells, and calculates the HOG, and the mean value and the dispersion value of the pixel coordinates with respect to each of the plurality of cells.

13. The object detection system of claim 10, further comprising a display device displaying a judgment result of the target object and the image.

14. The object detection system of claim 10, further comprising a storage device storing a judgment result of the target object and the image.

* * * * *